US009939985B2

United States Patent
Allrich et al.

(10) Patent No.: US 9,939,985 B2
(45) Date of Patent: *Apr. 10, 2018

(54) ONLINE WIZARD FOR FACILITATING METHODOLOGY IMPLEMENTATION

(71) Applicant: Microsoft Technology Licensing, LLC, Redmond, WA (US)

(72) Inventors: Brian R. Allrich, Moorhead, MN (US); Gregory M. Holman, Prairie Rose, ND (US); John R. Nannenga, Fargo, ND (US); Lori K. Thalmann Pytlik, Horace, ND (US); Nilesh R. Thakkar, Workingham (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,635

(22) Filed: Feb. 22, 2016

(65) Prior Publication Data
US 2016/0170573 A1    Jun. 16, 2016

Related U.S. Application Data

(63) Continuation of application No. 14/617,379, filed on Feb. 9, 2015, now Pat. No. 9,299,062, which is a
(Continued)

(51) Int. Cl.
*G06F 17/30* (2006.01)
*G06F 3/0481* (2013.01)
(Continued)

(52) U.S. Cl.
CPC .......... *G06F 3/0481* (2013.01); *G06Q 10/06* (2013.01); *G06Q 10/10* (2013.01); *G06Q 10/103* (2013.01);
(Continued)

(58) Field of Classification Search
USPC .................................. 707/706, 754
See application file for complete search history.

(56) References Cited

U.S. PATENT DOCUMENTS 7,092,968 B1 *   8/2006   Ebel .................. G06F 17/30563
7,302,674 B1 *  11/2007   Gladieux ............... G06Q 10/06
                                                         707/999.104
(Continued)

OTHER PUBLICATIONS

"Deploying Microsoft Dynamics Sure Step Project SharePoint Site", Retrieved at <<http://recyclableelectrons.blogspot.com/2010/01/deploying-microsoft-dynamics-sure-step.html>> Jan. 9, 2010, 4 pages.
(Continued)

*Primary Examiner* — Kim Nguyen
(74) *Attorney, Agent, or Firm* — Christopher J. Volkmann; Kelly, Holt & Christenson, PLLC

(57) ABSTRACT

Embodiments of a method for creating a methodology implementation that supplements a business application are described. In one embodiment, a comprehensive customer engagement methodology is maintained on a server and defines processes and disciplines related to the business application. A series of requests is received from a collaborative computing environment. The series of requests collectively represent a request for a collection of documents and related metadata included in the comprehensive customer engagement methodology. The series of requests are then responded to by providing a copy of the collection of documents and related metadata.

20 Claims, 8 Drawing Sheets

Related U.S. Application Data continuation of application No. 13/343,000, filed on Jan. 4, 2012, now Pat. No. 8,983,925.

(51) Int. Cl.
  *G06Q 10/06*  (2012.01)
  *G06Q 10/10*  (2012.01)
  *H04L 29/06*  (2006.01)
  *H04L 29/08*  (2006.01)
  *G06Q 30/00*  (2012.01)

(52) U.S. Cl.
  CPC ............ *G06Q 30/01* (2013.01); *H04L 65/403* (2013.01); *H04L 67/02* (2013.01); *H04L 67/10* (2013.01)

(56) References Cited

U.S. PATENT DOCUMENTS

| | | | |
|---|---|---|---|
| 7,496,850 B2* | 2/2009 | Miksovsky | G06F 17/3089 715/738 |
| 7,603,375 B2 | 10/2009 | Ng et al. | |
| 7,630,877 B2* | 12/2009 | Brown | G06F 8/20 700/100 |
| 7,752,190 B2* | 7/2010 | Skinner | G06Q 30/02 705/14.41 |
| 7,752,207 B2* | 7/2010 | Buzsaki | G06F 17/30471 707/737 |
| 7,801,874 B2* | 9/2010 | Bernacki | G06F 17/30592 707/706 |
| 7,890,212 B2 | 2/2011 | Cornett et al. | |
| 8,020,144 B2 | 9/2011 | Yang et al. | |
| 8,037,039 B2* | 10/2011 | Perry | G06F 17/30979 707/702 |
| 8,224,767 B2* | 7/2012 | Swaminathan | G06Q 10/06 706/60 |
| 8,983,925 B2 | 3/2015 | Allrich et al. | |
| 2010/0042376 A1 | 2/2010 | Weatherhead | |
| 2010/0088302 A1* | 4/2010 | Block | H04L 12/5895 707/706 |
| 2011/0202378 A1 | 8/2011 | Rabstejnek | |
| 2013/0173640 A1 | 7/2013 | Allrich et al. | |
| 2015/0154563 A1 | 6/2015 | Allrich et al. | |

OTHER PUBLICATIONS

"Introduction to the Microsoft Dynamics Sure Step Case Study", Retrieved at <<http://www.tud.ttu.ee/material/enn/IDU0010/Loeng3Sure_Step/80199A_ENUS_ERP/80199A_ENUS_ERP/80199_ENUS_ERP_01.pdf>>, Retrieved Date: Nov. 22, 2011, 16 pages.

Prosecution History for U.S. Appl. No. 13/343,000 including: Issue Notification dated Feb. 25, 2015, Notice of Allowance dated Nov. 24, 2014, Pre-Brief Conference Request dated Oct. 1, 2014, Notice of Appeal dated Oct. 1, 2014, Office Action dated Jul. 3, 2014, Amendment dated May 8. 2014, Office Action dated Jan. 2. 2014, Amendment with RCE dated Nov. 1, 2013, Office Action dated Jul. 1, 2013, Amendment dated Apr. 30, 2013, Office Action dated Jan. 16, 2013, Application and Drawings filed Jan. 4, 2012, 142 pages.

Prosecution History for U.S. Appl. No. 14/617,379 including: Notice of Allowance dated Nov. 20, 2015, Pre-Brief Appeal Conference Decision dated Sep. 16, 2015, Terminal Disclaimer Review Decision dated Sep. 5, 2015, Terminal Disclaimer dated Sep. 1, 2015, Applicant Summary of Interview with Examiner dated Sep. 1, 2015, Pre-Brief Conference Request dated Aug. 13, 2015, Notice of Appeal dated Aug. 13, 2015 and Non-Final Office Action dated Jun. 3, 2015, 41 pages.

* cited by examiner

ONLINE WIZARD FOR FACILITATING METHODOLOGY IMPLEMENTATION

CROSS-REFERENCE TO RELATED APPLICATION(S)

The present application is a continuation of and claims priority of U.S. patent application Ser. No. 14/617,379, filed Feb. 9, 2015, which is a continuation of and claims priority of U.S. patent application Ser. No. 13/343,000, filed Jan. 4, 2012, the contents of these applications are hereby incorporated by reference in their entirety.

BACKGROUND

Currently the market includes a variety of different enterprise resource planning (ERP) and customer relationship management (CRM) software applications. It can be difficult and expensive for a company to implement a customized ERP and/or CRM solution. Some companies use in-house development services for such purposes while others utilize outside service providers. An entire industry has developed around the reselling of ERP and CRM applications and associated specialized services.

At least one ERP/CRM application provider currently offers a comprehensive customer engagement methodology that supplements their application offerings by defining processes and disciplines for a particular implementation of their application technology. The methodology includes many hundreds of content pages and metadata describing a range of configuration options and relationships between the content pages. At least a portion of the content is provided in a plurality of different supported languages.

Currently, a client-driven approach is utilized to manage the selection of a limited number of portions of the methodology that are relevant to a given application project, as well the creation of a corresponding collaborative site in a remotely shared work environment. This approach can require installation of the entire methodology content on the local client computer and then utilization of a thick client application to create the collaboration site. In some cases, the cooperation of an administrator of the collaboration site is required to install necessary software upon the server on which the collaboration site is to be hosted. Further, each release/update to the methodology generally requires installation of update components on the local client computer.

SUMMARY

Embodiments described herein pertain to creation of a methodology implementation that supplements a business application. A comprehensive customer engagement methodology is maintained on a server and defines processes and disciplines related to the business application. A series of requests is received from a collaborative computing environment. The series of requests collectively represent a request for a collection of documents and related metadata included in the comprehensive customer engagement methodology. The series of requests are then responded to by providing a copy of the collection of documents and related metadata.

DETAILED DESCRIPTION OF ILLUSTRATIVE EMBODIMENTS

At least one ERP/CRM application provider currently offers a comprehensive customer engagement methodology (CE-methodology) that supplements their application offerings by defining processes and disciplines for a particular implementation of their application technology. In one embodiment, the CE-methodology provides, among other things, a software process that helps establish which entities or individuals are responsible for which tasks, the order in which the tasks should be completed, and a timeline for completion of the tasks. The CE-methodology illustratively defines process phases, milestone roles, artifacts, cross-phase-processes and a variety of project management processes.

Another way of conceptualizing the CE-methodology, in accordance with another embodiment of the present invention is to think of it as a software model that provides a series of components. The components illustratively include static content, such as HTML content, diagram content (e.g., flow chart diagrams, block diagrams, etc.), and templates. Also included may be source content of templates (e.g., HTML, block diagram, and/or word processing document templates). Then, the components may include tools for adding, deleting, or modifying the source content and for generating new static content.

Figure 1:
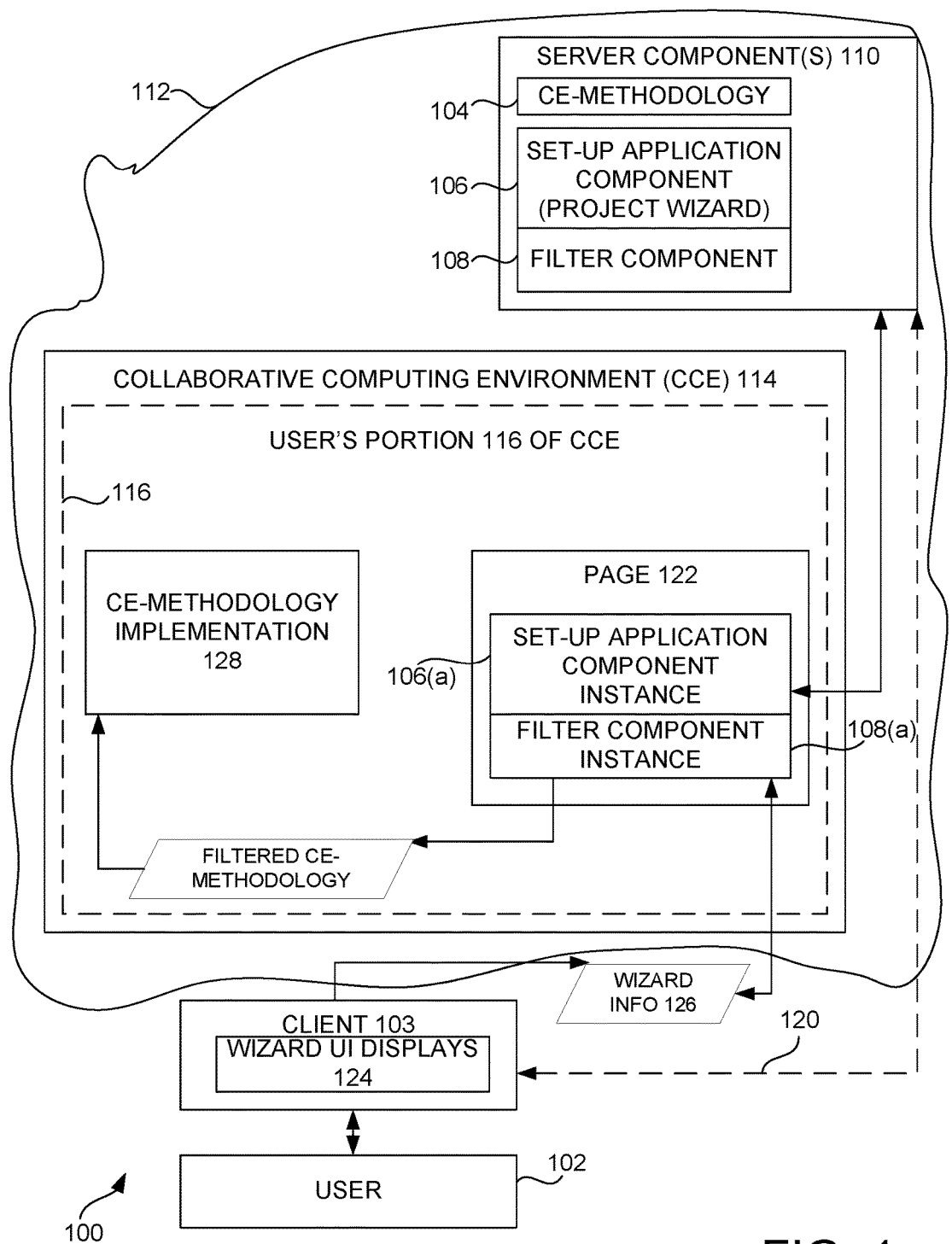
FIG. 1 is a schematic block diagram of a network-based methodology implementation system.

FIG. 1 is a schematic block diagram of a system 100 that is a network-based (e.g., an "online" based) system that enables a user 102 to utilize a client computing device 103 to selectively implement the CE-methodology. In particular, system 100 enables user 102 to bring together contextually relevant content portions of the CE-methodology 104, as well as associated metadata and/or tools, in a particularly meaningful way for the ERP/CRM engagement or project upon which the user is working.

System 100 includes CE-methodology 104 and set-up application component 106 and filter component 108 operating on a server component 110. While components 104, 106, and 108 are illustrated as operating on the same server component, they just as easily could be operating on different server components. In fact, those skilled in the art will appreciate that any of the components of system 100 can be distributed differently without departing from the spirit or scope of the present invention.

Server component 110 is shown as operating in cloud 112. This is simply meant to imply that components 104, 106 and 108 are provided on one or more servers that are accessible through a network of computers, which illustratively but not necessarily may include portions of the Internet. Cloud 112 signifies operation of various components of system 100 in a service sense, whereby shared resources, software, and information are exchanged remotely across a computer network medium.

Also included within the cloud is a collaborative computing environment 114. In one embodiment, but certainly not by limitation, environment 114 is the SharePoint® Server platform provided by Microsoft Corporation of Redmond, Wash. However, more broadly speaking, environment 114 illustratively provides a space within its architecture for organizations, on an organization-by-organization basis, to conveniently centralize access to enterprise data, information and applications. In one embodiment, the platform supports collaborative interaction relative to the organization's data, information and/or applications. In another embodiment, the platform provides authentication functionality, which in some cases may be a password-protected, web-facing interface. Upon proper authentication, a user can illustratively access some or all of her or her organization's portion of the platform.

Dotted box 116 represents one organization's portion of the collaborative computing environment 114 (e.g., a SharePoint® site maintained by the organization). In particular, the portion is illustratively that of an organization with which user 102 is affiliated. Thus, in one embodiment, user 102 has the credentials necessary to log into portion 116 of the collaborative computing environment 114.

In one embodiment, activity within system 100 is initiated when user 102 interacts with client computing device 103 so as to initiate an electronic signal indicating an interest in creating a CE-methodology implementation. In one embodiment, not by limitation, the user 102 initiates the electronic signal by clicking or otherwise activating a hyperlink in an online or client installed application, such as an installation of an ERP or CRM application with which the CE-methodology is associated. An arrow 120 is provided within FIG. 1 to represent communication to server component(s) 110 of the activated hyperlink or other manifestation of the user's interest.

The server component(s) 110 will be described as initiating the next step in the process. However, those skilled in the art will appreciate that the next steps could otherwise be initiated and could be initiated by different components of system 100 without departing from the scope of the present invention. In one embodiment, the next steps occur automatically upon receipt of the user's expression of interest. However, in another embodiment, the user is prompted for his or her confirmation before the next steps are activated. Further, information may first be gathered from the user and/or the user may be asked to log into their portion 116 of the collaborative computing environment 114.

At some point in time, such as upon or before it is determined that user 102 desires to create a CE-methodology implementation, an instance of set-up application component 106 (also referred to herein as the "project wizard") and filter component 108 are transferred to the user's portion 116 of the collaborative computing environment 114. In one embodiment, this means that components 106 and/or 108 are configured to run from a web page 122 in the user's portion 116 of environment 114. One benefit of this configuration is that the process of configuring the CE-methodology implementation is able to leverage the authentication modes and modules that are already in place for the collaborative computing environment 114. Thus, in one embodiment, it can be assumed that user 102 is authorized to access and/or use features of the project wizard and the filter component if they demonstrate the credentials necessary to access area 116 of environment 114.

Further, functions associated with components 106 and 108 are illustratively able to leverage multiple platforms in circumstances where the environment 114 are configured for such possibilities. For example, when the application associated with environment 114 is configured to support the 116 platform environment in addition to a local platform environment on client device 103, it is within the scope of the present invention to distribute some or all of the CE-methodology implementation in either or both platforms. Should the application 114 have access to other platforms, then it is within the scope of the present invention for all or part of the CE-methodology implementation to be distributed to the other platforms. The processes for creating the CE-methodology implementation are able to, in essence, enjoy the benefits of the authentication processes and distribution possibilities that are part of the functionality bestowed upon portion 116 of environment 114 as part of the standard functions of the application responsible for environment 114.

In order to avoid confusion, the instances of the set-up application component (project wizard) 106 and filter component 108 operating from page 122 will be referred to from this point forward as components 106($a$) and 108($a$), respectively. Component 106($a$) illustratively includes a plurality of user interface components, at least some of which are provided to user 102 through client device 103. These user interface components are identified in FIG. 1 as wizard UI displays 124. The UI displays 124 may be presented to user 102 in any particular way but are illustratively presented as components accessed through page 122 by way of a client run browser application.

The user 102 walks through the wizard UI displays 124 and, by doing so, answers questions and otherwise provides information about the circumstances surrounding the soon to be created CE-methodology implementation. This information is identified in FIG. 1 as wizard information 126. Information 126 is returned to component 106($a$) and/or component 108($a$).

Based on the information 126, filter component 108($a$) is configured to programmatically coordinate creation of a collaboration site. In one embodiment, which is reflected in FIG. 1, this means creation of a collaboration site 128 within area 116 of the collaborative computing environment 114. The collaboration site 128 illustratively becomes the manifestation of the CE-methodology implementation. As has been alluded to, all or portions of the collaboration site 128, and therefore of the CE-methodology implementation, may be installed upon the client device or another server (i.e., a local server hosted by user 102's organization) to which client 103 has access. In one particular embodiment, the collaboration site is created in a SharePoint® environment as an OnPremise implementation, an Online implementation, or a combination of the two, which is likely to depend at least partially on the supported authentication modes.

It is perhaps the most common that filter component 108($a$) will coordinate creation of the CE-methodology implementation 128 solely as a collaboration site within portion 116 of the collaborative computing environment. Thus, that is the scenario reflected in FIG. 1. The filter component 108($a$) is illustratively configured to select (based in whole or in part on wizard info 126 provided by user 102 into user interface displays 124) relevant documents associated metadata, tools and the like. The component 108($a$) is also configured to upload to the implementation 128 the selected relevant information from CE-methodology content 104 stored on server component(s) 110. Still further, the filter component 108($a$) is illustratively configured to programmatically create environment 114 constructs (e.g., SharePoint® artifacts) and other constructs as necessary to support formation of the implementation 128. In one embodiment, this means the creation of sites, lists, list views, list items, list item properties, quick launch items, navigation items, and/or tasks, which may or may not be supported programmable constructs within the environment 114. The component 108(*a*) is illustratively configured to populate the created artifacts based on information provided in the CE-methodology content (and related metadata, etc.) describing the documents/information. In another embodiment, component 108(*a*) configures the created CE-methodology implementation 128 to support the authentication modes otherwise utilized (e.g., utilized by user 102) for interacting with the collaborative computing environment (e.g., for interacting with the SharePoint® platform).

In one embodiment, the programmatic creation of the collaboration site 128 and the associated uploading of documents from content 104 are managed by component 106(*a*) and/or component 108(*a*) so as to incorporate asynchronous parallel processing. Component 108(*a*) is illustratively configured to queue up the process steps required for creating implementation 128 and to perform the tasks asynchronously. This allows for the process steps to be processed in parallel. Such parallel processing enables particularly efficient utilization of network bandwidth by streamlining the network traffic. Components operating on server(s) 110 in conjunction with the CE-methodology 104 are illustratively configured to perform the requested asynchronous calls to environment 114, to handle any callbacks, to report errors properly, to manage the process flow, and provide a queue for documents (and process steps) to optimize network throughput by running process steps in parallel if conditions are met to allow for parallel processing. Thus, in one embodiment, parallel processing is utilized when retrieving documents from the server and uploading them to the collaborative computing environment. The process illustratively supports parallel processing of any of the steps in the implementation creation process but, in another embodiment, programmatically takes into consideration and accounts for dependencies such as will be described below in relation to FIG. 4.

In another embodiment, the server component 110 that includes the comprehensive body of CE-methodology content 104 is managed by the development team responsible for maintaining and updating the content 104. This enables frequent updates to be made to the CE-methodology by the development team. Thus, each time a CE-implementation 128 is produced (e.g., each time the project wizard is applied); it is produced with the latest version of the CE-methodology content available.

In one embodiment, component 106(*a*) and/or component 108(*a*) are built using tools designed to construct rich Internet applications and media experiences on the World Wide Web. In another embodiment, such tools are designed for integrating an application within collaborative computing environment 114. In more specific embodiments, one or both components are built using C#, Microsoft Silverlight, and the Microsoft SharePoint® Silverlight Client Object Model. The MVVM design pattern is illustratively utilized to enable the user interface components to be de-coupled from the underlying data in the model, which also enables unit testing of the application independent of the user interface components.

In one embodiment, component 106(*a*) and/or component 108(*a*) include a processing engine containing a set of objects, methods, and a workflow for creating the CE-methodology implementation 128. The user interface views 124 gather information from the user 102 and store the information in a central object. A progress control mechanism illustratively initiates a background process to perform the necessary work for creating the implementation 128. The background process is illustratively responsible for queuing up the process steps, initiating the process steps, determining if the process steps can run in parallel, handling any progress reporting to the progress control, and handling any error conditions by reporting them back to the user, if necessary.

Each of the process steps that integrate with environment 114 can illustratively be processed synchronously for simplicity or in parallel based on defined conditions/dependencies for each process step. Each of the process steps illustratively fires an event when they are finished which illustratively is handled so as to trigger the next process step.

Figure 2:
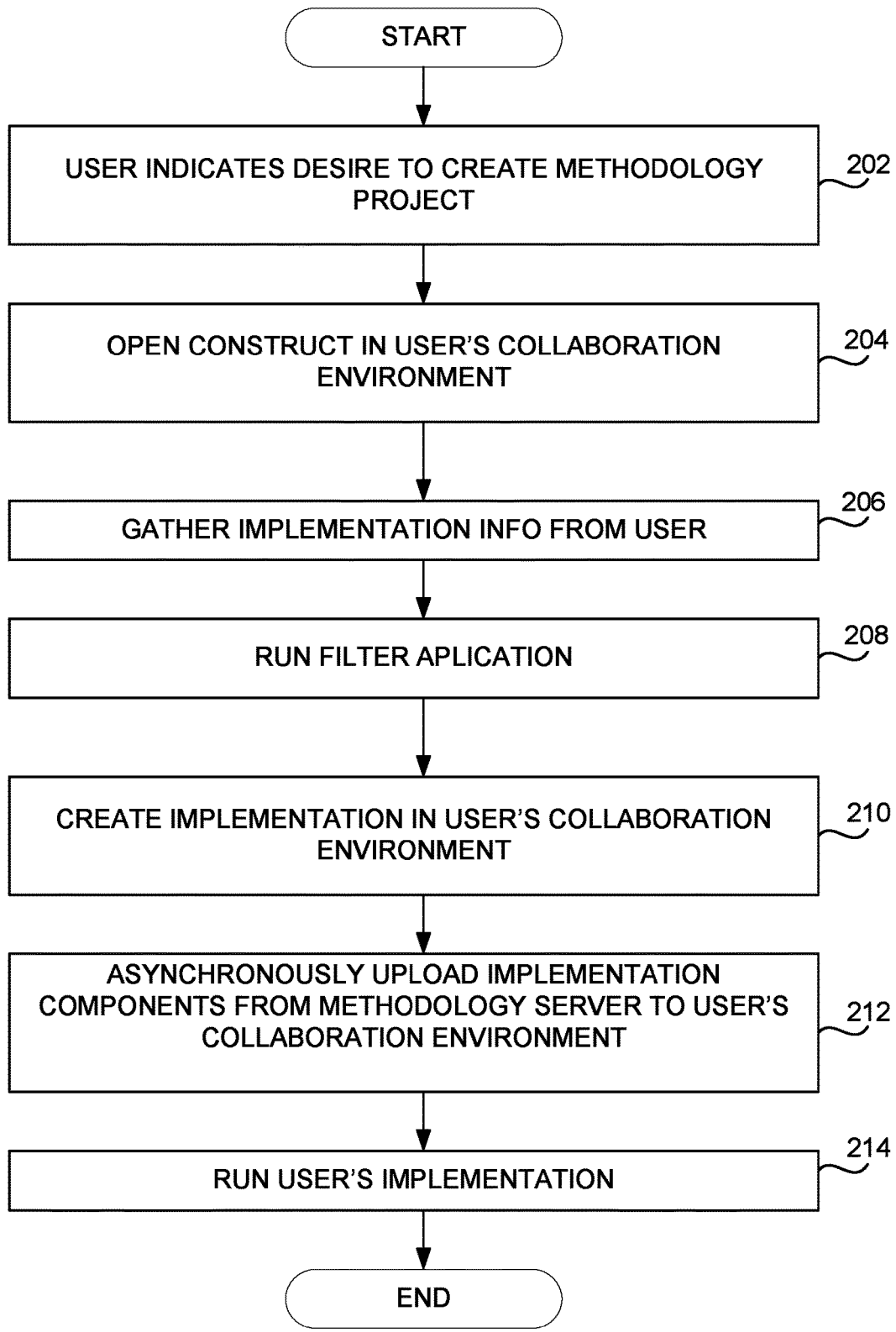
FIG. 2 is a block flow diagram of a process for preparing and running a methodology implementation.

FIG. 2 demonstrates, in a block flow diagram format, steps 200 that enable user 102 to prepare and run the CE-methodology implementation 128. In accordance with block 202, user 102 provides an indication of a desire to create a methodology implementation. For example, but not by limitation, the user activates a link that initiates communication with a cloud-based methodology server indicating the desire to create the implementation.

In accordance with block 204, the methodology server responds by opening a construct (e.g., a web page construct) in a collaborative computing environment with which user 102 is affiliated. In accordance with block 206, user 102 is provided with user interfaces from the opened construct. The user interfaces facilitate interaction so as to gather implementation configuration details from user 102.

In accordance with block 208, a filter application is activated. In accordance with block 210, the CE-methodology implementation is created in the user's collaboration environment (e.g., created as a site within the programmatic framework of the collaboration environment). In one embodiment, the filter application is the component that initiates creation of the implementation. In accordance with block 212, the filter application asynchronously uploads, based at least in part on the implementation configuration details gathered from user 102, implementation components from the methodology server to the CE-methodology implementation created in the user's collaboration environment. Finally, in accordance with block 214, the user, and potentially other users associated with the user, runs the created implementation 128 from the collaboration environment. In one embodiment, this means the implementation 128 runs from cloud 112 and the user therefore runs the implementation remotely over the computer network.

Figure 3:
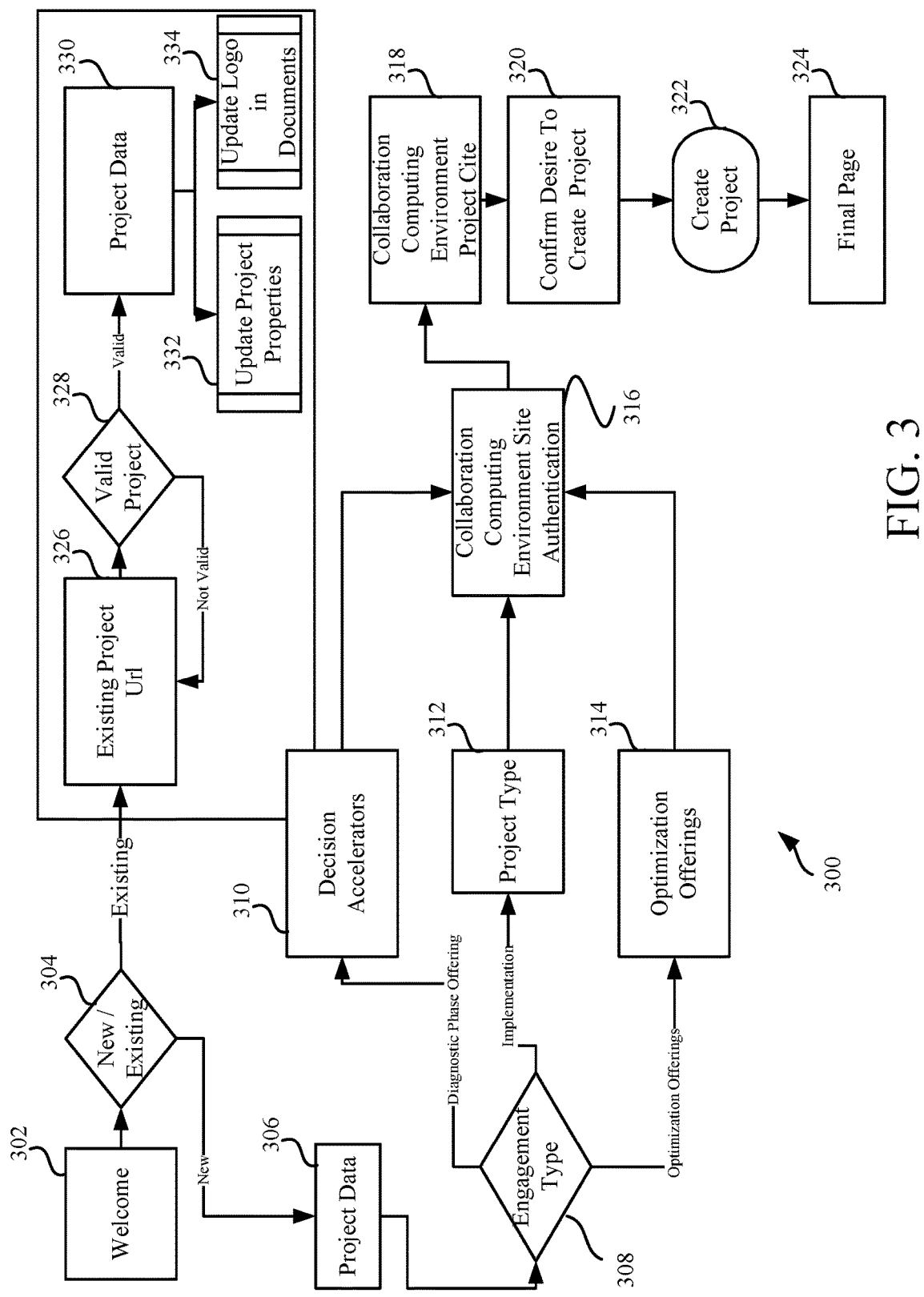
FIG. 3 is a block flow diagram 300 demonstrating steps associated with creating a methodology implementation.

FIG. 3 is a block flow diagram 300 demonstrating, in more detail; steps associated with creating the CE-methodology implementation based on input from user 102 as communicated by the user through interaction with the project wizard. The project wizard, in one embodiment, is the online set-up component 108, which illustratively operates from the user's shared computing environment 114. FIG. 3 gives some additional insight into the nature of screenshots 124 that are illustratively provided in order to facilitate the gathering of implementation configuration details from user 102.

Block 302 simply represents welcoming user 102 into the configuration process. Block 304 represents ascertaining from the user whether they are creating a new CE-implementation project or continuing work on an existing project. Assuming a new project, block 306 represents gathering project data from the user 102. This illustratively means facilitating interaction with the user by way of an online project wizard so as to collection variables, preferences, and configuration choices that will affect the details of the final implementation 128.

Block 308 represents three optional paths 310, 312 and 314. Each of these three paths represents another process for gathering project data from the user 102. The user may go through any or all of these three processes depending upon the nature of the final implementation 128 that the user intends to create. As is indicated in the figures, the configurations associated with the three paths pertain to different sets of variables related to implementation diagnostic, project type and optimization details, respectively.

In accordance with block 316, after the project variables and configurations have been collected from the user by way of his or her interactions with user interfaces that are part of an online project wizard, the user then is prompted to log on to their collaborative computing environment 116. Upon successfully authenticating and thereby logging on, in accordance with block 318, a new corresponding project site (e.g., a web site or web page) is created within the collaborative environment 116. Block 320 represents a carrying out of a confirmation process, for example (but not by limitation), a window/view that presents the user with an opportunity to confirm the implementation creation process. In accordance with block 322, the CE-methodology implementation 128 is created so as to reflect the preferences gathered from user 102 in accordance with blocks 306-314. Embodiments of actions that occur on the backend in order to facilitate the implementation have been described herein in relation to other Figures.

Assuming at block 304 that user 102 is instead returning to work with an existing CE-methodology implementation, the next step in the process (blocks 326 and 328) is to confirm that the user is requesting to work with an actual valid implementation. Assuming so, at block 330, the user is allowed to update the data for the implementation and, in accordance with block 332 and 334, corresponding updates are made to the implementation accordingly. In one embodiment, in order to update the implementation as requested by the user, the backend components will utilize an application component operating within collaboration environment 114. In particular, the component is illustratively utilized to obtain data from server component(s) 110 in a manner similar to that described herein in relation to the initial setup of the implementation.

Figure 4:
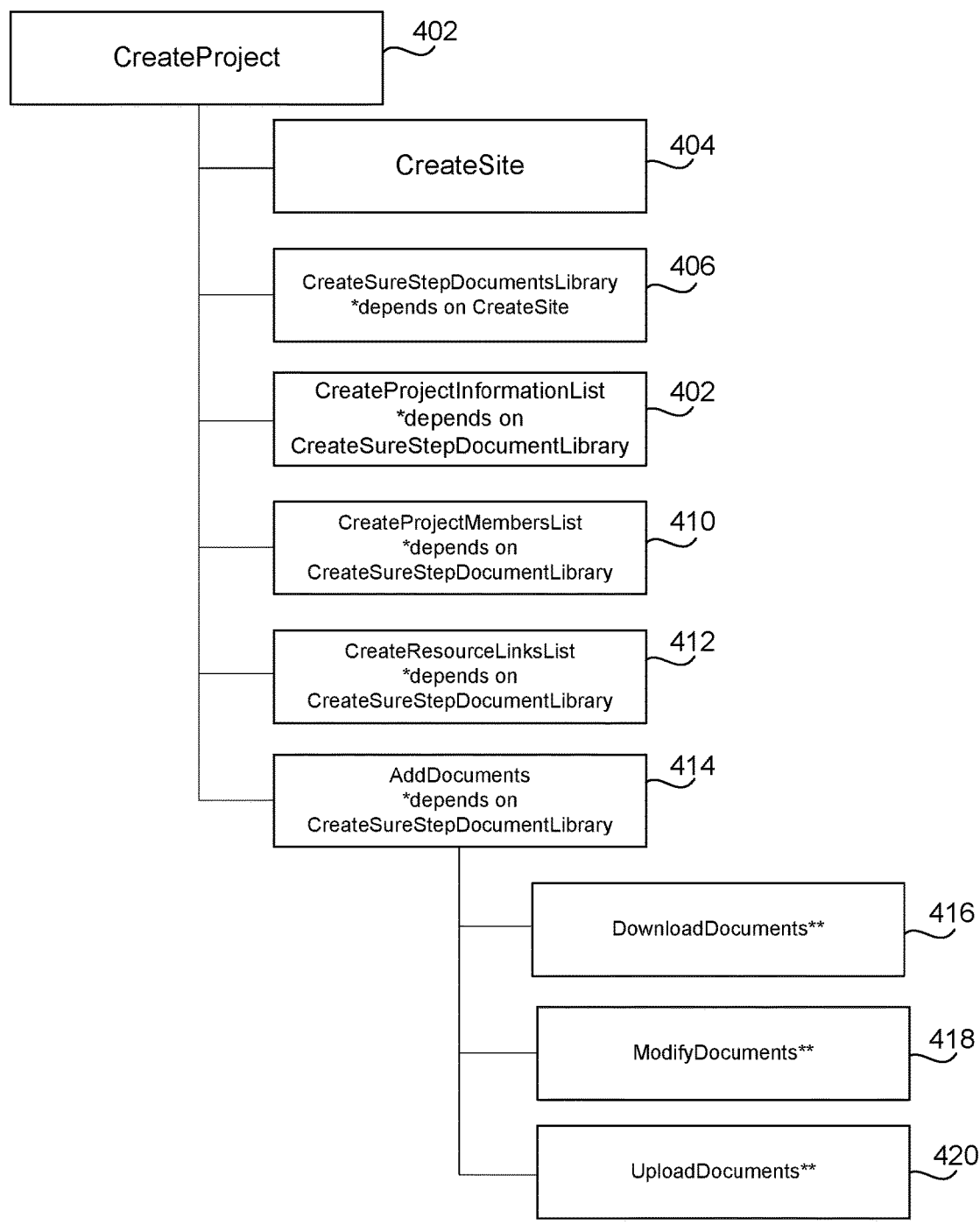
FIG. 4 is a schematic flow diagram demonstrating an exemplary set of programmatic steps associated with creating a methodology implementation.

FIG. 4 is a schematic flow diagram demonstrating an exemplary set of programmatic steps associated with creating, in accordance with an embodiment of the present invention, a CE-methodology implementation in a manner as described herein. Block 402 is a logical representation of the CE-methodology implementation and the main driver of the process steps 404-420 utilized to create the implementation. Block 404 represents creation of a site for the CE methodology implementation. In one embodiment, this means creating the site as a programmatic construct within a portion of the collaborative computing environment to which the user is authorized to obtain access to at least a portion. Steps 406, 408, 410, 412, and 414 represent the creation of constructs within the created project/site. Finally, the DownloadDocuments 416, ModifyDocuments 418, and UploadDocuments 420 block represent, as has been described herein, obtaining data from a methodology server remotely operating in a computer network as necessary to support creation of the implementation. In one embodiment, the processes represented by block 416-420 obtain their document data from a common DocumentQueue that is populated based on the information provided by the user (e.g., utilizing a process the same or similar to that described in FIG. 3). This illustratively means obtaining a filtered (i.e., less than all) sub-set of CE-methodology data maintained on the methodology server. In one embodiment, a Document will fire an event when its State has changed and the DownloadDocuments, ModifyDocuments, and UploadDocuments processes will register handlers for this StateChanged event. In the handlers they will determine if they can perform more work based on the State of the documents. In one embodiment, a limit is placed on the number of Documents that may be downloaded into memory at any given time.

FIGS. 5-8 show a number of different embodiments for computing devices upon which embodiments of the present invention may be implemented. While these embodiments will be described in FIGS. 5-8, it should be noted that these are not exclusive, but are provided as illustrative and exemplary descriptions of embodiments of devices applicable to embodiments of the present invention.

Systems such as the business applications (e.g., ERP or CRM applications), online wizard components, collaborative computing applications, and other software programs described herein can fully or partially reside on a client device such as but not limited to those specifically shown and described herein. However, such systems could just as easily be fully or partially embodied elsewhere, such as in a cloud computing environment. Cloud computing provides computation, software, data access, and storage services that generally do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software, as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, functions described herein can be provided from a service provider at a remote location using a cloud computing architecture. Alternatively, they can be provided from a conventional server, or they can be installed on a client device directly.

Figure 5:
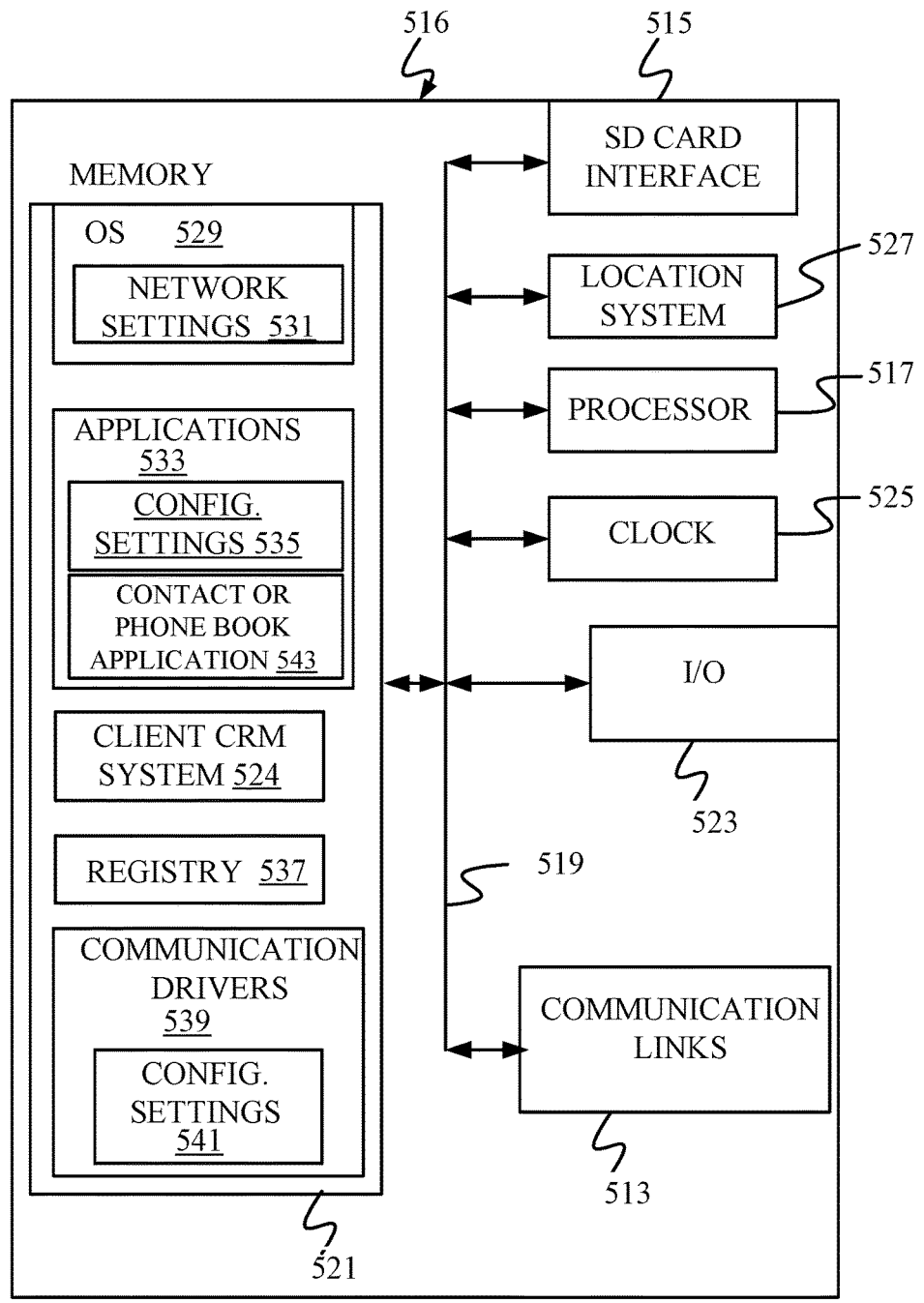
FIG. 5 is a simplified block diagram of a handheld or mobile computing device.
Figure 6:
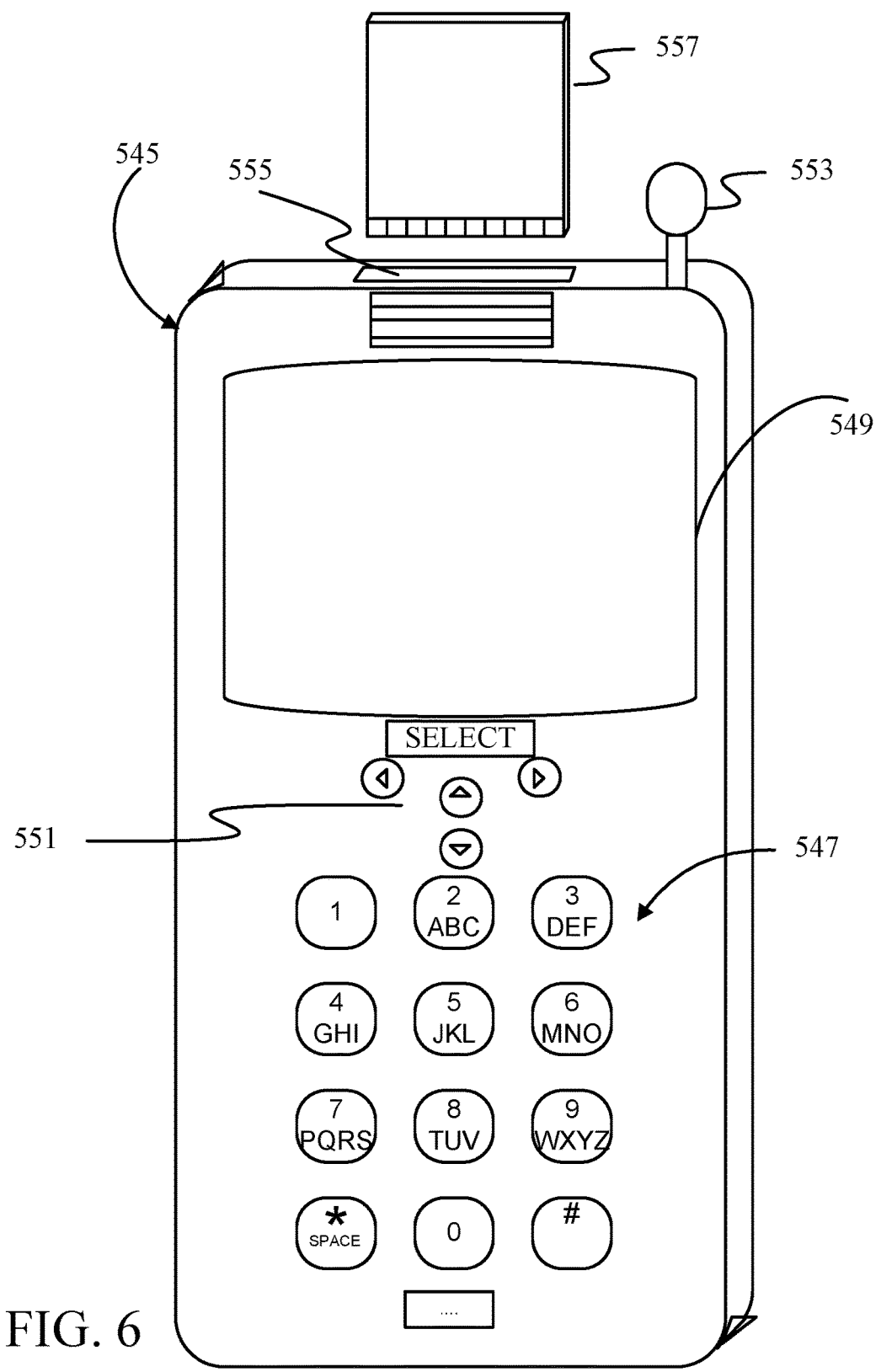
FIGS. 6 and 7 are schematic examples of handheld or mobile devices.
Figure 7:
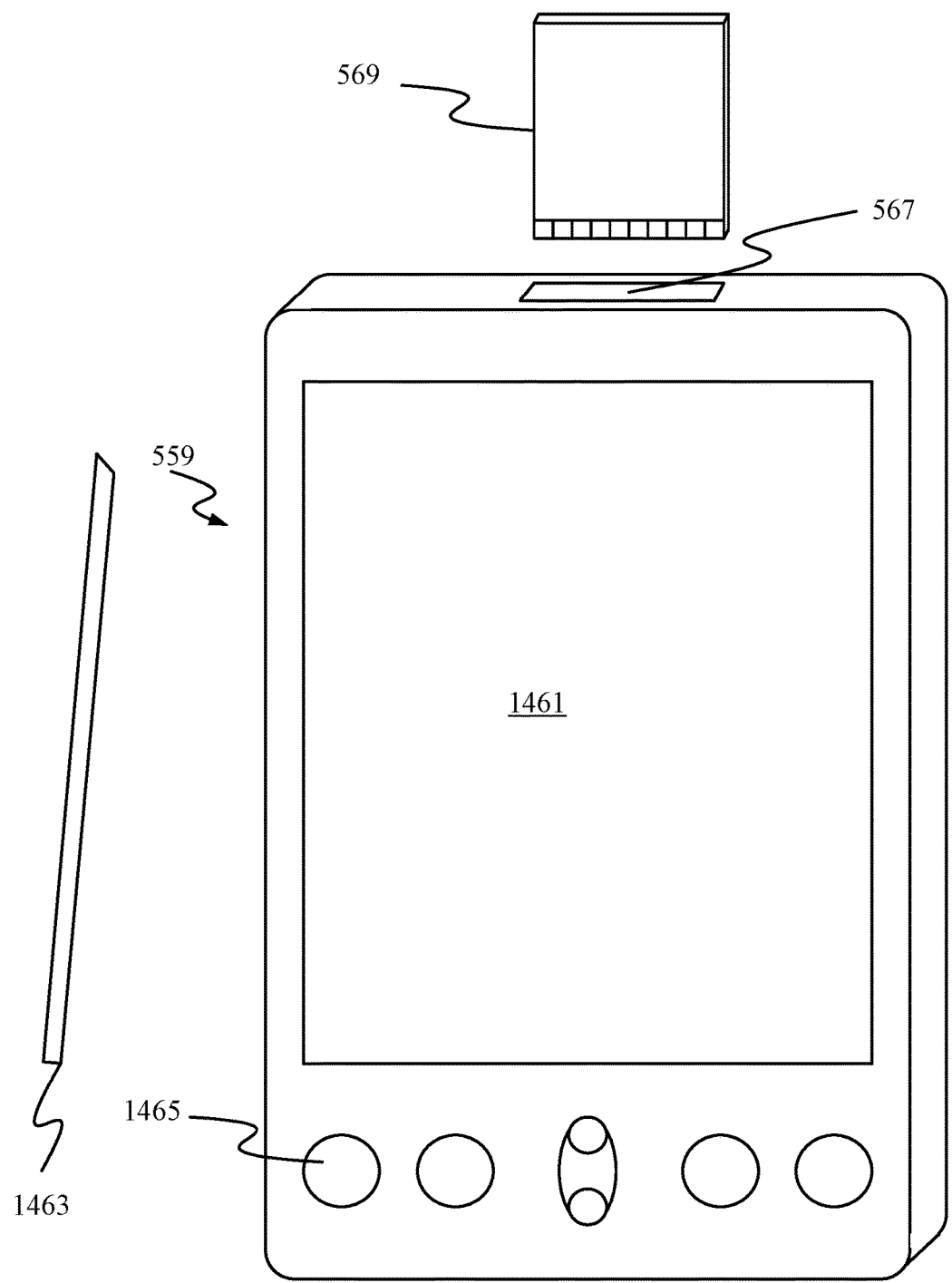

In any case, FIG. 5 is a simplified block diagram of one illustrative embodiment of a handheld or mobile computing device that can be used as a client device, upon which systems that implement embodiments of the present invention may be deployed. FIGS. 6 and 7 are examples of handheld or mobile devices.

FIG. 5 provides a general block diagram of the components of a client device 518. In the device, a communications link 513 is provided that allows the handheld device to communicate with other computing devices and under some embodiments provides a channel for receiving information automatically, such as by scanning. Examples of communications link 513 include an infrared port, a serial/USB port, a cable network port such as an Ethernet port, and a wireless network port allowing communication though one or more communication protocols including General Packet Radio Service (GPRS), 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 515. SD card interface 515 and communication links 513 communicate with a processor 517 along a bus 519 that is also connected to memory 521 and input/output (I/O) components 523, as well as clock 525 and location system 527.

I/O components 523, in one embodiment, are provided to facilitate input and output operations. I/O components 523 for various embodiments of the device can include input components such as buttons, touch sensors, touch screens, proximity sensors, microphones, tilt sensors, and gravity switches and output components such as display device 526, a speaker, and or a printer port. Other I/O components 523 can be used as well.

Clock 525 illustratively comprises a real time clock component that outputs a time and date. It can also, illustratively, provide timing functions for processor 517.

Location system 527 illustratively includes a component that outputs a current geographical location of device 518. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 521 stores operating system 529, network settings 531, applications 533, application configuration settings 535, registry 537, communication drivers 539, and communication configuration settings 541. Memory 521 can include all types of tangible volatile and non-volatile computer-readable memory devices. Memory 521 stores computer readable instructions that, when executed by processor 517, cause the processor to perform computer-implemented steps or functions according to the instructions. Processor 517 can be activated by other components to facilitate their functionality as well.

Examples of the network settings 531 include things such as proxy information, Internet connection information, and mappings. Application configuration settings 535 include settings that tailor the application for a specific enterprise or user. Communication configuration settings 541 provide parameters for communicating with other computers and include items such as GPRS parameters, SMS parameters, connection user names and passwords.

Applications 533 can be applications that have previously been stored on the device 518 or applications that are installed during use. In one embodiment, applications 533 can be part of operating system 529, or hosted external to device 518, as well.

FIGS. 6 and 7 provide examples of devices 518 that can be used, although others can be used as well. In FIG. 6, a smart phone or mobile phone 545 is provided as the device 518. Phone 545 includes a set of keypads 547 for dialing phone numbers, a display 549 capable of displaying images including application images, icons, web pages, photographs, and video, and control buttons 551 for selecting items shown on the display. The phone includes an antenna 553 for receiving cellular phone signals such as General Packet Radio Service (GPRS) and 1Xrtt, and Short Message Service (SMS) signals. In some embodiments, phone 545 also includes a Secure Digital (SD) card slot 555 that accepts a SD card 557.

The mobile device of FIG. 7 is a personal digital assistant (PDA) 559 or a multimedia player or a slate or tablet computing device, etc. (hereinafter referred to as PDA 559). PDA 559 includes an inductive screen 561 that senses the position of a stylus 563 (or other pointers, such as a user's finger) when the stylus is positioned over the screen. This allows the user to select, highlight, and move items on the screen as well as draw and write. PDA 559 also includes a number of user input keys or buttons (such as button 565) which allow the user to scroll through menu options or other display options which are displayed on display 561, and allow the user to change applications or select user input functions, without contacting display 561. Although not shown, PDA 559 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 559 also includes a SD card slot 567 that accepts a SD card 569.

Note that other forms of the devices 518 are possible. Examples include tablet or slate computing devices, music or video players, and other handheld computing devices.

Figure 8:
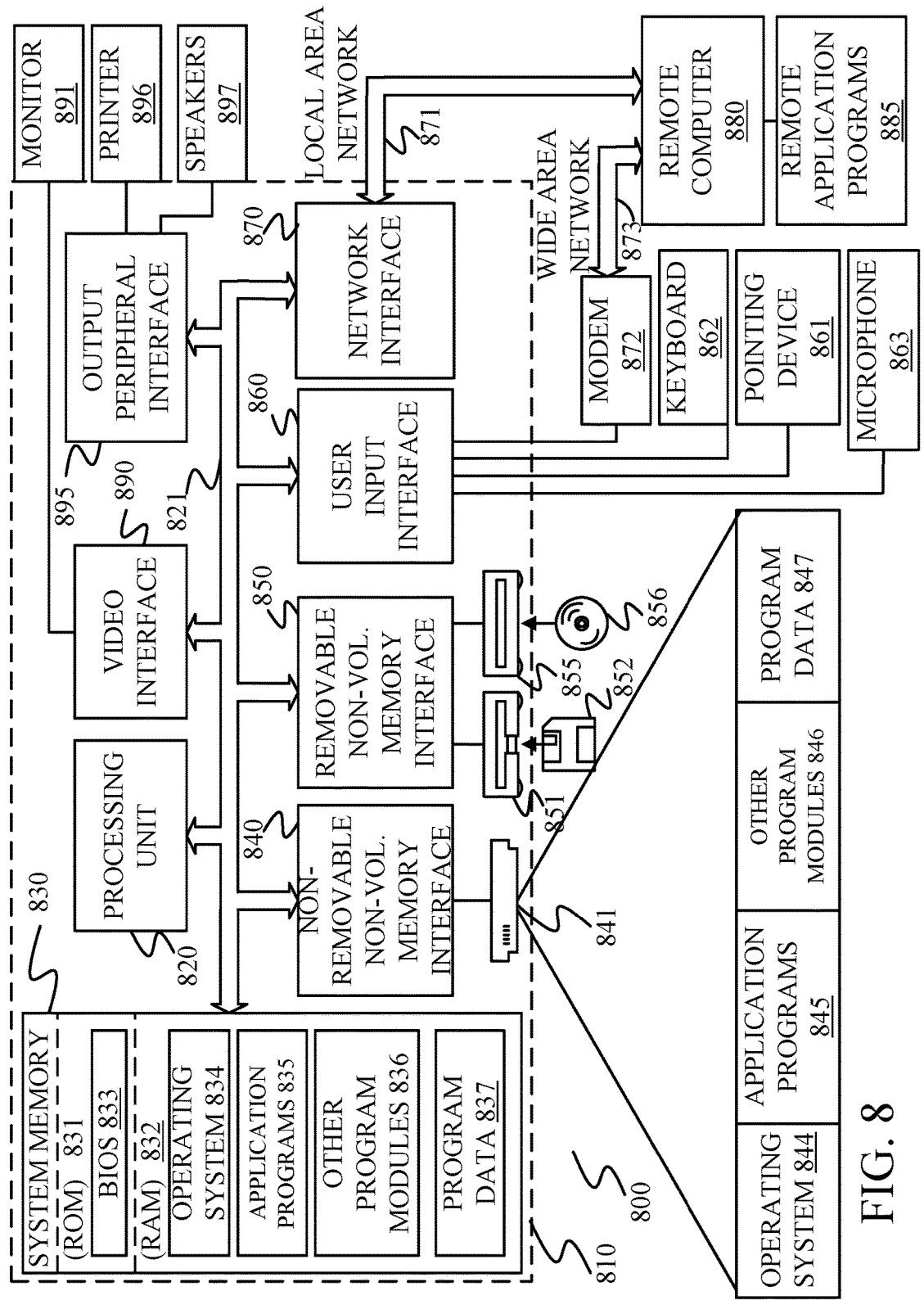
FIG. 8 is a schematic diagram of a computer or a computing device.

FIG. 8 is one embodiment of another computing environment. With reference to FIG. 8, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. They can also include search components 802 and 804.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
a processor;
a communication interface configured to communicate with a collaborative computing environment that is separate from the computing system; and
memory storing instructions which, when executed by the processor, configure the computing system to:
receive an application request indicative of an input associated with a client device that is separate from both the computing system and the collaborative computing environment;
based on the application request, identify application functionality that is associated with an application that is requested by the client device;
based on the identified application functionality, select a collection subset that comprises some, but not all, of a collection of one or more documents and related metadata, the collection subset defining a process related to the application functionality; and
utilize the communication interface to transmit the collection subset to the collaborative computing environment that is configured to host the application functionality for the client device over a communication network.

2. The computing system of claim 1, wherein the request originates from the collaborative computing environment that remotely communicates with the computing system over a network.

3. The computing system of claim 2, wherein the communication interface receives the request directly from the collaborative computing environment.

4. The computing system of claim 1, wherein the request is received from the client device that communicates with the collaborative computing environment over the communication network.

5. The computing system of claim 4, wherein the instructions configure the computing system to generate a web interface that receives an indication of a user input from the client device that requests the application functionality.

6. The computing system of claim 1, wherein the request includes a configuration variable, and wherein the instructions configure the computing system to:
identify the application functionality based on the configuration variable.

7. The computing system of claim 6, and further comprising a data store that stores the collection, the data store being remote from the collaborative computing environment.

8. The computing system of claim 6, wherein the request comprises a series of requests collectively requesting the subset that defines the process related to the application functionality.

9. The computing system of claim 8, wherein the series of requests comprise asynchronous calls.

10. The computing system of claim 8, wherein the instructions configure the computing system to:
utilize a filter component to identify the subset from the collection by applying a filter criterion to the collection, wherein the filter criterion is based on information in the series of requests.

11. The computing system of claim 10, wherein the filter component is configured to:
generate a queue that stores the subset;
identify tasks to be performed to transmit the subset to the collaborative computing environment to create the application functionality; and
in parallel, perform a set of the tasks.

12. The computing system of claim 1, wherein the application functionality comprises functionality of an enterprise resource planning (ERP) application or a customer relationship management (CRM) application.

13. A computer-implemented method comprising:
receiving, by a server computing system, an application request indicative of an input associated with a client device;
based on the application request, identify application functionality associated with an application that is requested by the client device;
identifying a filter criterion based on the identified application functionality
filtering, using a filter component associated with the server computing system, a collection of one or more documents and related metadata based on the filter criterion;
identifying, by the server computing system, a collection subset based on filtering the collection, the collection subset comprising some, but not all, of the collection, and defining a process related to the application functionality; and
transmitting the collection subset from the server computing system to a collaborative computing environment that is separate from both the server computing system and the client device, the collaborative computing environment being configured to host the application functionality.

14. The computer-implemented method of claim 13, wherein the request originates from the collaborative computing environment that remotely communicates with the server computing system over a communication network.

15. The computer-implemented method of claim 13, wherein the requests comprise asynchronous calls, the method further comprising:
creating a queue that stores a collection of documents and related metadata defining the process; and
sending the collection of documents stored in the queue to the collaborative computing environment in response to the asynchronous calls.

16. A computer-implemented method comprising:
receiving, though a web interface associated with a collaborative computing environment, a request that is associated with a user and indicative of requested application functionality;
authenticating, using an authentication module associated with the collaborative computing environment, the user based on the request;
based on authentication of the user, sending a communication from the collaborative computing environment to a computing system that is distinct from the collaborative computing environment, the communication being indicative of a request for a set of documents and related metadata related to the application functionality;
receiving a response to the communication from the computing system, the response including the set of documents and related metadata; and
hosting, by the collaborative computing environment, the application functionality based on the set of documents and related metadata.

17. The computer-implemented method of claim 16, wherein the application functionality is hosted in the collaborative computing environment by establishing a communication interface with a client computing device that interacts with the application functionality.

18. The computer-implemented method of claim 17, wherein the web interface comprises a wizard interface that receives an indication of one or more user inputs from the client computing device.

19. The computer-implemented method of claim 18, wherein sending the communication comprises sending a series of requests collectively requesting the set of documents and related metadata.

20. The computer-implemented method of claim 18, wherein the series of requests comprise asynchronous calls.

* * * * *